United States Patent [19]
Baudu et al.

[11] Patent Number: 6,044,641
[45] Date of Patent: *Apr. 4, 2000

[54] LOCKING SYSTEM FOR AN AIRCRAFT JET ENGINE THRUST REVERSER DOOR INCLUDING A PLURALITY OF LOCKING DEVICES ARRANGED TO PREVENT DEFORMATION OF THE THRUST REVERSER DOOR

[75] Inventors: Pierre André Marcel Baudu, Le Havre; Patrick Gonidec, Montivilliers; Pascal Gerard Rouyer, Saint Aubin Routot; Guy Bernard Vauchel, Le Havre, all of France

[73] Assignee: Societe Hispano-Suiza, France

[*] Notice: This patent issued on a continued prosecution application filed under 37 CFR 1.53(d), and is subject to the twenty year patent term provisions of 35 U.S.C. 154(a)(2).

[21] Appl. No.: 08/980,618
[22] Filed: Dec. 1, 1997

[30] Foreign Application Priority Data

Dec. 5, 1996 [FR] France ................................ 96 14923

[51] Int. Cl.[7] ........................................... F02K 1/70
[52] U.S. Cl. ...................... 60/226.2; 60/230; 244/110 B
[58] Field of Search ................................ 60/226.2, 230; 244/110 B; 239/265.27, 265.29, 265.31

[56] References Cited

U.S. PATENT DOCUMENTS

| 4,865,256 | 9/1989 | Durand et al. ...................... 239/265.29 |
| 5,120,004 | 6/1992 | Matthias .............................. 60/226.2 |

*Primary Examiner*—Ted Kim
*Attorney, Agent, or Firm*—Bacon & Thomas PLLC

[57] ABSTRACT

A locking system is disclosed for an aircraft jet engine thrust reverser door that is movably connected to an engine cowling so as to be movable between a forward thrust position and a reverse thrust position, the cowling having a reverse thrust opening that is covered by the thrust reverser door when in the forward thrust position and uncovered when the thrust reverser door is in the reverse thrust position. The locking system has a plurality of locking devices attached to the cowling at the forward side of the reverse thrust opening with at least one locking device located on opposite sides of a longitudinal line equidistantly spaced from opposite lateral sides of the thrust reverser door such that the locking devices simultaneously lock the thrust reverser door in the forward thrust position.

6 Claims, 3 Drawing Sheets

LOCKING SYSTEM FOR AN AIRCRAFT JET ENGINE THRUST REVERSER DOOR INCLUDING A PLURALITY OF LOCKING DEVICES ARRANGED TO PREVENT DEFORMATION OF THE THRUST REVERSER DOOR

BACKGROUND OF THE INVENTION

The present invention relates to a locking system for a thrust reverser of an aircraft turbojet engine, more particularly, such a locking system having at least one locking device on opposite sides of a thrust reverser door longitudinal center line.

Turbofan-type turbojet engines are well known in the art and typically comprise a fan driven at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow at a downstream portion from the turbojet engine, or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

FIGS. 1 and 2 illustrate a known pivoting door-type thrust reverser associated with the cowling of a turbofan-type turbojet engine. As illustrated in FIG. 1, the upstream portion of the cowling which defines the outer limits of the bypass flow duct and which is generally concentrically arranged about the turbojet engine (not shown) is designated as 1 and generally comprises an external cowling panel and an internal cowling panel interconnected by a frame 6. The outer surface of the external cowling panel has an aerodynamic surface over which the air external to the engine passes during aircraft flight. The inner surface of the inner cowling panel defines the outer boundary of the bypass flow duct 15 through which the bypass flow air passes in the direction of arrow 14.

The cowling also comprises a thrust reverser, illustrated generally at 2, and a downstream cowling portion 3. The thrust reverser 2 comprises a door 7 pivotally attached to the cowling so as to pivot about transverse axis 17 such that it is movable between a closed, forward thrust position, illustrated in FIG. 1, and an open, reverse thrust position in which the forward end (towards the left as viewed in FIG. 1) of the thrust reverser door 7 is moved outwardly from the cowling, while a rear portion is moved inwardly into the bypass flow duct airstream so as to redirect at least a portion of the bypass flow through an opening in the cowling in a direction that has a reverse thrust component.

An actuator 8 for moving the door 7 between its forward thrust and reverse thrust positions may comprise a hydraulic cylinder extending through and mounted to the flame 6, and having an extendible and retractable piston rod connected to the thrust reverser door 7.

The thrust reverser door 7 has an outer door panel 9 and an inner door panel 11 joined together by an internal structure. The forward end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream fairing 3. The inner surface 11 tapers toward the outer surface 9 at the forward end of the door 7, forming cavity 16 when in the forward thrust position.

As illustrated in FIG. 2, a plurality of thrust reverser doors 7 may be incorporated into the cowling, such doors being circumferentially spaced around the periphery of the cowling. A portion 18 of the cowling extends axially between forward part 4 and the rear part 3 of the cowling adjacent thrust reverser doors 7 to provide structural rigidity to the cowling and to provide pivot mounting points for attaching the doors 7 to the cowling. French Patents 1,482,538 and 2,030,034 illustrate typical, known thrust reversers.

U.S. Pat. No. 3,605,411 discloses a pivoting door-type thrust reverser in which the deflector mounted to the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflectors 13 project from the inner panel 11 of the thrust reverser door 7 even when the door is in its forward thrust position without extending into the bypass flow duct. This forms a cavity 16 facing inwardly into the bypass flow duct which will slightly degrade engine performance.

French Patent 2,680,547 discloses a thrust reverser having a combination of spoilers and deflectors to attempt to optimize the direction of exhaust flow.

Most door-type thrust reversers also have several different locking systems to keep the doors locked in their forward thrust positions, one such locking system being termed the primary lock. The primary lock is generally situated between the frame of the cowling adjacent to the front side of the reverse thrust opening and the forward edge of the door. The primary lock may be mounted either above the door actuator aligned with a longitudinal central axis of the thrust reverser door, or on one side or the other of the actuator offset from the central longitudinal door axis.

When the thrust reverser door is constrained by a central primary lock located along the longitudinal axis of the door, the door has a recessed housing to receive the actuator body within the thickness of the cowling structure. As a consequence, the cross section of the forward door portion is reduced, thereby lessening its structural rigidity.

When the thrust reverser door is in the forward thrust position, gas flow in the annular duct 15 exerts pressure on the inside surface 11 of the thrust reverser door 7. Because, as noted above, the thrust reverser door having reduced structural rigidity due to the location of the primary lock, the thrust reverser door may undergo more or less pronounced deformation depending upon flight conditions of the aircraft. Such pressure acting on the thrust reverser door can change the curvature of the thrust reverse door in the transverse direction thereby disengaging the door from the seal 5 at its forward edge degrading aerodynamic performance of the engine and aircraft, and reducing the door tightness.

SUMMARY OF THE INVENTION

A locking system is disclosed for an aircraft jet engine thrust reverser door that is movably connected to an engine cowling so as to be movable between a forward thrust position and a reverse thrust position, the cowling having a reverse thrust opening that is covered by the thrust reverser door when in the forward thrust position and uncovered when the thrust reverser door is in the reverse thrust position. The locking system has a plurality of locking devices attached to the cowling at the forward side of the reverse thrust opening with at least one locking device located on opposite sides of a longitudinal line equidistantly spaced from opposite lateral sides of the thrust reverser door such that the locking devices simultaneously lock the thrust reverser door in the forward thrust position.

By locating at least one device on each side of the longitudinal axis spaced apart from each other, the drawbacks of the known locking systems are obviated. The locking devices according to the present invention assure alignment of the outer and inner surfaces of the door with the corresponding surfaces of the cowling to prevent any aerodynamic disruptions during aircraft operation. The invention also improves the distribution of the door locking stresses in the thrust reverser structure, without significantly increasing the overall weight of the thrust reverser.

DETAILED DESCRIPTION OF THE PREFERRED EMBODIMENTS

Figure 1:
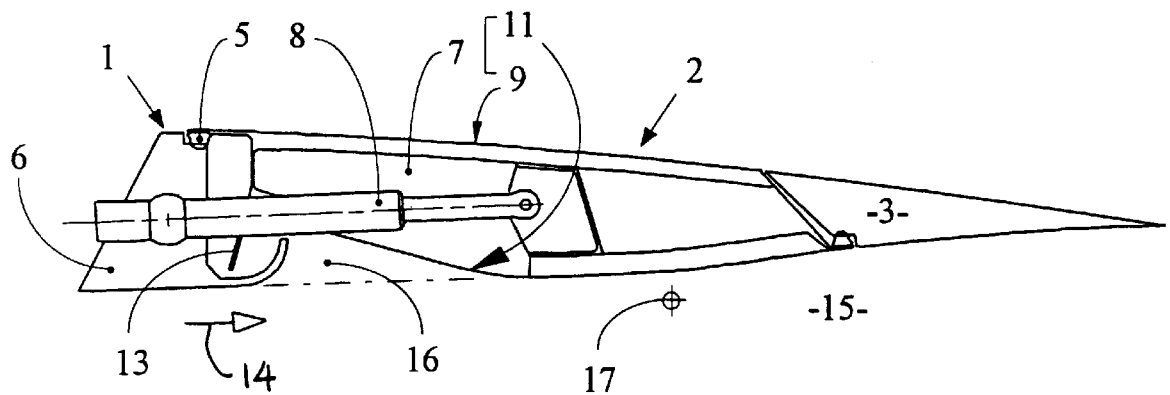
FIG. 1 is a partial, longitudinal, cross-sectional view illustrating a known pivoting door-type thrust reverser with the thrust reverser door in the forward thrust position.
Figure 2:
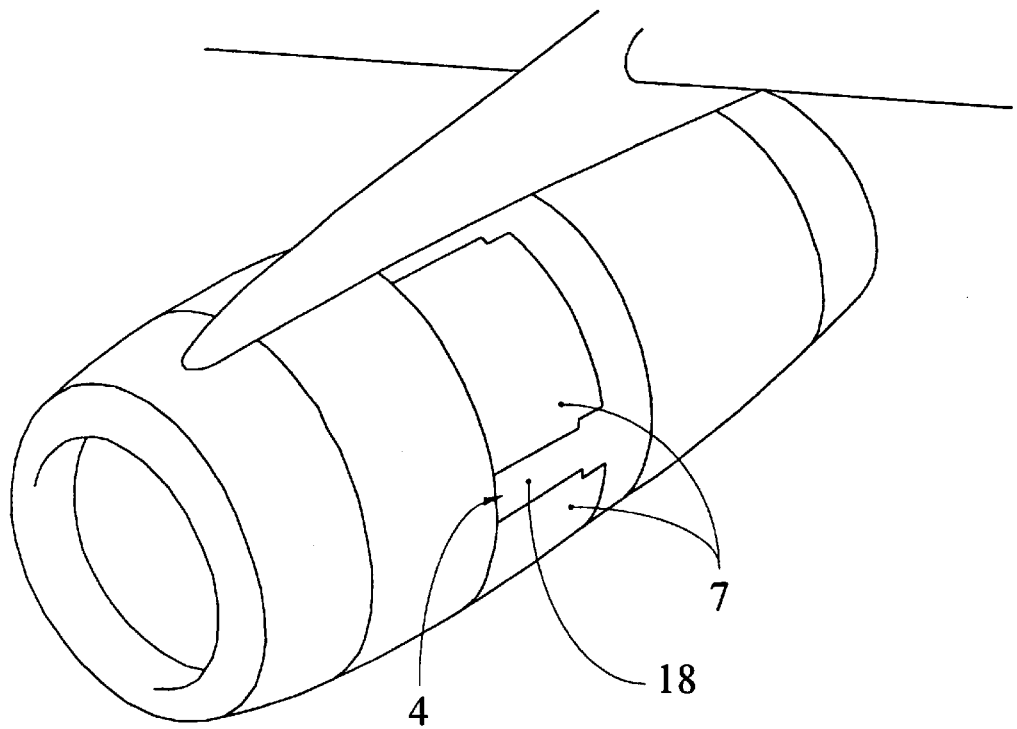
FIG. 2 is a perspective view of an aircraft engine cowling incorporating the thrust reverser illustrated in FIG. 1.
Figure 3:
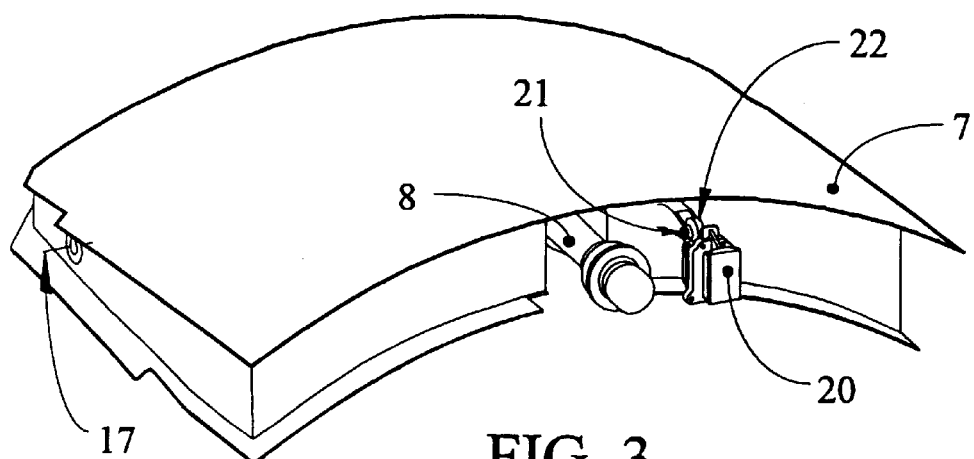
FIG. 3 is a perspective view of a thrust reverser door and lock of a known type.
Figure 4:
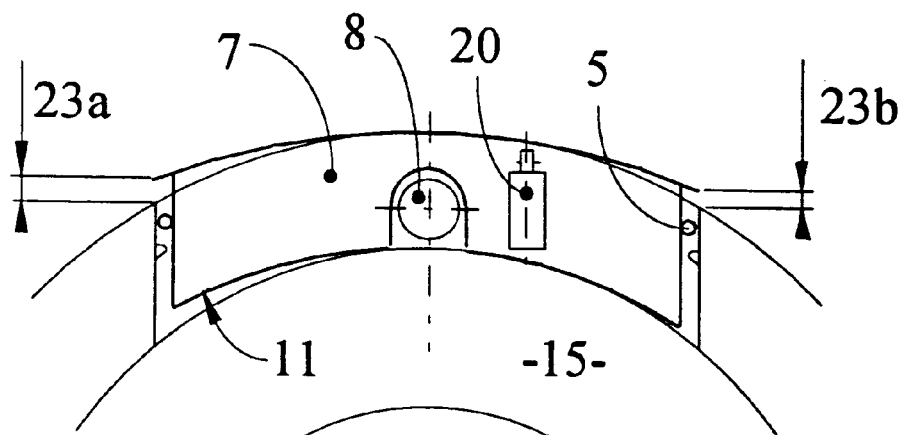
FIG. 4 is a cross-sectional schematic view illustrating a deformation of the thrust reverser door and opposite lateral edges utilizing the locking system illustrated in FIG. 3.

FIGS. 3 and 4 illustrate a known locking system for the door 7 of a pivoting door-type thrust reverser. A locking device 20 is rigidly affixed to the frame 6 of the stationary structure of the cowling 1 and is either placed in alignment with the longitudinal central axis of the thrust reverser door 7, or slightly offset from it, as best illustrated in FIG. 4. In the forward thrust position, the locking device 20 locks the door by engaging the catch 22 of the locking devices with the ferrule 21 mounted on a forward side of the thrust reverser door 7. The pressure applied to the inside surface 11 of the thrust reverser door 7 by the gas flow passing through the duct 15 deforms the door structure relative to the cowling. The largest deformation occurs in the forward sides of the thrust reverser door 7, such deviation being illustrated at 23a and 23b in FIG. 4. Such deviations cause the outer surface of the deformed portion of the door to be displaced from the adjacent surfaces of the cowling such that the door 7 is no longer flush with the cowling surf-ace. As a consequence, the deformed portions of the thrust reverser door may loose contact with the seal 5 to cause loss of sealing and the deformed portions create aerodynamic perturbations along the outer and inner surfaces of the cowling.

Once possible solution to this deformation problem would be to reinforce the structure of the door 7. However, this would entail an increase in weight resulting in more negative effects than the curing of the aerodynamic losses due to the door deformations. At present, designers must reach a compromise trade-off between the weight of the system and its structural rigidity.

Figure 5:
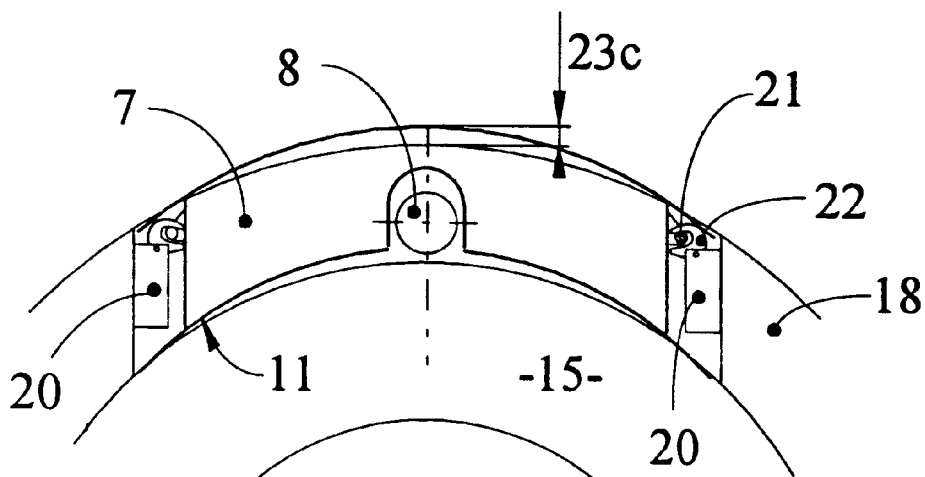
FIG. 5 is a transverse, schematic representation of a thrust reverser door having known lateral locks illustrating the deformation of the center portion of the thrust reverser door.

Locating the locking devices 20 on the opposite lateral sides of the thrust reverser door at the adjacent to the forward portion, as illustrated in FIG. 5, also has not completely resolved the deformation problem. In this instance, the pressure acting on the inner surface 11 of the door 7 would deform the center portion of the thrust reverser door 7 a distance 23c, again resulting in aerodynamic losses to the overall cowling structure.

Figure 7:
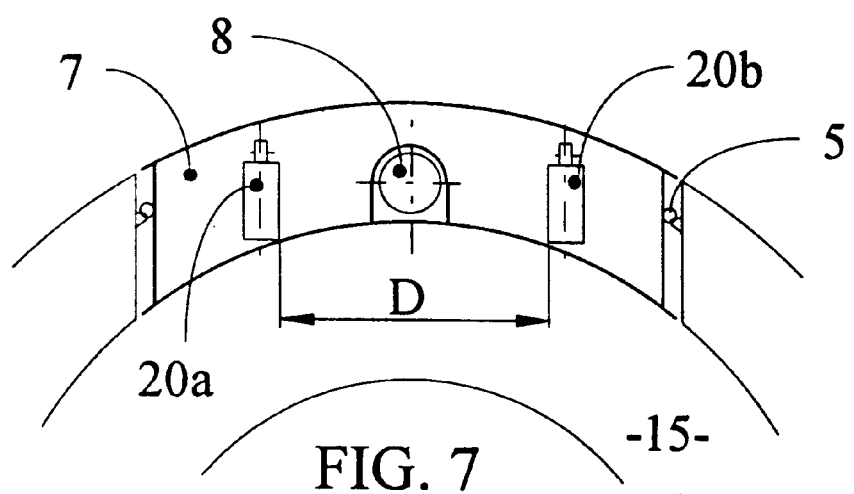
FIG. 7 is a transverse, schematic cross-sectional view of the thrust reverser door illustrated in FIG. 6.

The present invention is applicable to any thrust reverser door having at least one door 7. The invention comprises mounting two locking devices 20a and 20b fixedly attached to the forward structure 6 located forwardly of the reverse thrust opening in the cowling such that at least one lock is mounted on each side of the longitudinal central axis of the thrust reverser door which may coincide with the axis of the linear actuator 8. In operation, the two locks 20a and 20b are simultaneously in contact with the thrust reverser door 7 so as to lock it in its forward thrust position. As best illustrated in FIG. 7, the locking devices 20a and 20b are spaced apart a distance D. The engine cowling encloses a rotor, which may be a fan of a fan-type turbojet engine, wherein the distance D is at least one-third the diameter of the rotor and corresponding in size to the largest engine fragment that might be expelled in case of an engine explosion. Depending upon the overall configuration of the cowling assembly, the distance between the locking devices 20a and 20b may be centered on the longitudinal central axis of the door 7, each locking device being equally spaced from the longitudinal central axis. It is also within the scope of this invention to locate the locking devices 20a and 20b different distances from the longitudinal central axis of the door.

Figure 6:
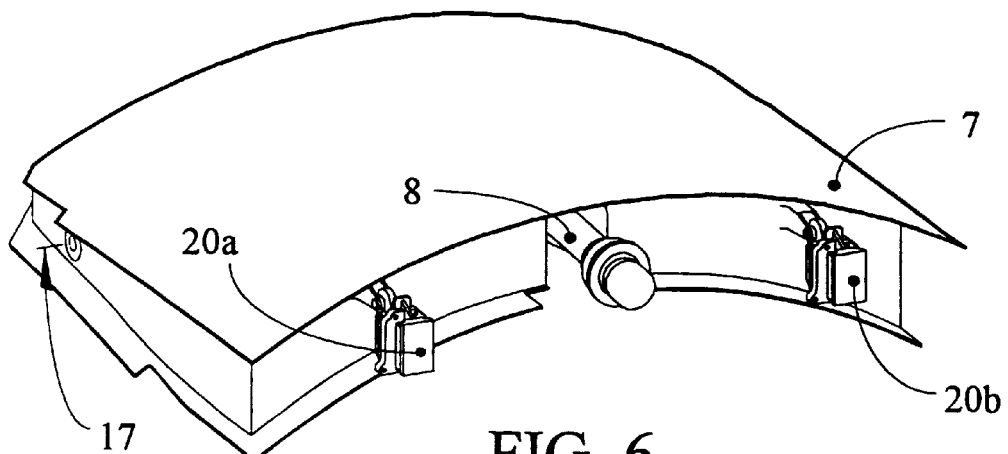
FIG. 6 is a perspective view of a thrust reverser door incorporating the locking system according to the present invention.
Figure 8:
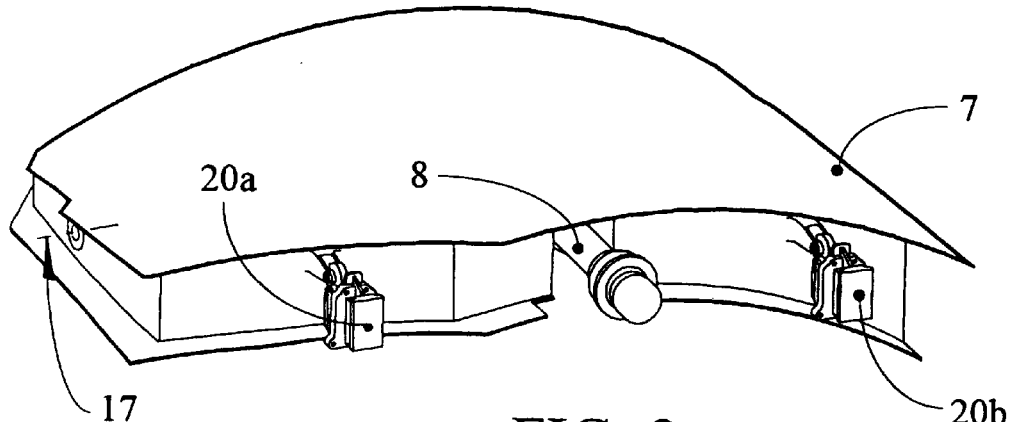
FIG. 8 is a perspective view of a thrust reverser door and locking system according to a second embodiment of the present invention.

FIG. 6 illustrates the locking system according to the present invention applied to a thrust reverser door 7 having a generally rectangular configuration in plan view, while FIG. 8 is a similar view illustrating the locking system according to the present invention applied to a thrust reverser door having one side of the forward edge tapered toward the rear. The structure illustrated in FIG. 8, wherein one lateral side of the front edge, is closer to the pivot axis 17 than is the opposite side of the forward edge is less sensitive to the gas pressures applied to the inner surface of the door, thereby enabling the locks 20a and 20b to be placed differing distances from the longitudinal central axis of the door 7. The asymmetrical locations of the locking devices 20a and 20b may be applied to other thrust reverser door configurations that are subjected to asymmetrical aerodynamic and internal pressure forces. Also, in the embodiment illustrated in FIG. 8, the locking device 20a can be installed in an orientation other than parallel to the longitudinal axis of the cowling.

Such a locking system contains the deformation of the thrust reverser door caused by internal pressure forces over the full inside surface 11 of the thrust reverser door 7 to minimize, or eliminate completely any deformations of the thrust reverser door relative to the adjacent cowling structure. The invention also eliminates the danger of loss of sealing between the door and the stationary cowling.

Locking the locking devices close to the beam portion 18 of the cowling extending between the forward and rear cowling portions may enable the forward frame 6 to be reduced in weight while maintaining the same structural rigidity.

The use of two primary locks, 20a and 20b, simultaneously locking the door in identical fashion reduces the effects of failure of one of the locking devices to latch and lock the door 7 in the forward thrust position. Should that occur, the other primary lock will prevent any movement of the thrust reverser door and the exertion of any undue stresses on the cowling structure by the thrust reverser door through the actuating mechanism.

The foregoing description is provided for illustrative purposes only and should note be construed as in any way limited this invention, the scope of which is defined solely by the appended claims.

We claim:

1. A locking system for an aircraft jet engine thrust reverser door movably connected to an engine cowling so as to be movable between a forward thrust position and a reverse thrust position, the cowling having an aerodynamic outer surface, an aerodynamic inner surface and a reverse thrust opening that is covered by the thrust reverser door when in the forward thrust position and uncovered when the thrust reverser door is in the reverse thrust position, the thrust reverser door having an outer surface and an inner surface which are respectively aerodynamically aligned with the outer and inner surfaces of the cowling when in the forward thrust position, the locking system comprising:

a plurality of locking devices attached to the cowling at a forward side of the reverse thrust opening, at least one of the locking devices being located on each opposite side of a longitudinal line equidistantly spaced from opposite sides of the thrust reverser door, the locking devices being located between the line and the respective opposite side of the thrust reverser door, the locking devices being arranged to simultaneously lock the thrust reverser door in the forward thrust position such that the thrust reverser door is prevented from moving relative to the cowling and the outer and inner surfaces of the thrust reverser door are maintained respectively aerodynamically aligned with the outer and inner surfaces of the cowling during operation.

2. The locking system of claim 1 comprising one locking device on each side of the longitudinal line separated by a distance D.

3. The locking system of claim 2 wherein the cowling encloses a rotor of the jet engine and wherein D is equal to at least one-third the diameter of the rotor.

4. The locking system of claim 2 wherein each locking device is equidistantly spaced from the longitudinal line.

5. The locking system of claim 2 wherein the locking devices are not equally spaced from the longitudinal line.

6. The locking system of claim 2 wherein the locking devices are mounted parallel to the longitudinal line.

* * * * *

UNITED STATES PATENT AND TRADEMARK OFFICE
CERTIFICATE OF CORRECTION

PATENT NO.   : 6,044,641
DATED        : April 4, 2000
INVENTOR(S)  : Pierre Baudu et al.

It is certified that error appears in the above-identified patent and that said Letters Patent is hereby corrected as shown below:

Column 1, line 57; change "flame to --frame--

Column 3, line 63; change "surf-ace" to --surface--

Signed and Sealed this

Fifth Day of June, 2001

*Attest:*

*Attesting Officer*

NICHOLAS P. GODICI
*Acting Director of the United States Patent and Trademark Office*